Sept. 11, 1923.

C. H. TODD

SAW FRAME AND TABLE

Filed May 20, 1922   2 Sheets-Sheet 1

1,467,887

Charles H. Todd, INVENTOR.

BY Geo. F. Kimmel, ATTORNEY.

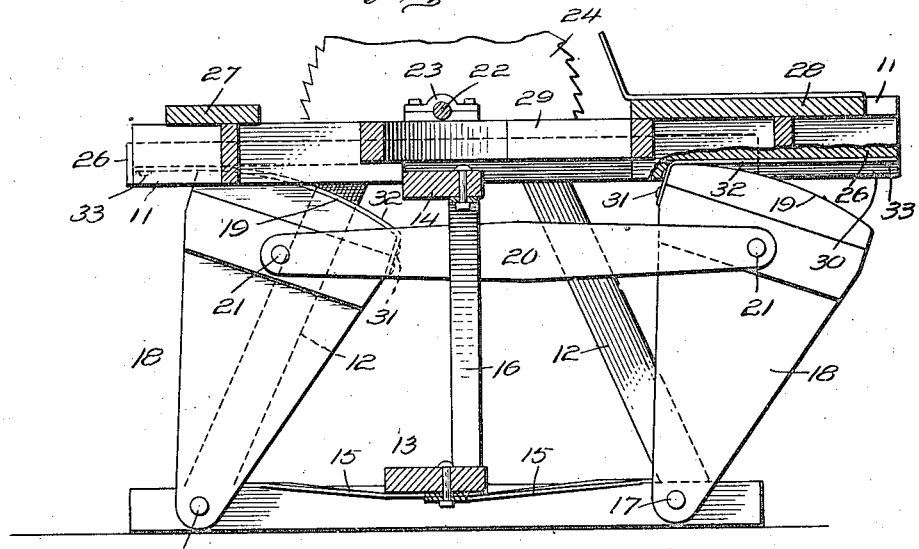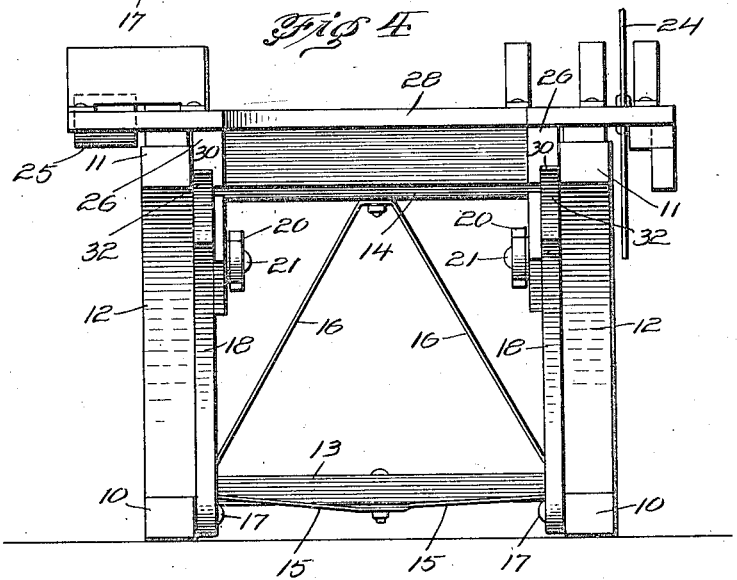

Patented Sept. 11, 1923.

1,467,887

UNITED STATES PATENT OFFICE.

CHARLES H. TODD, OF DUNDEE, NEW YORK, ASSIGNOR OF ONE-FOURTH TO E. C. STEWART AND ONE-FOURTH TO ELLA M. WEBER, BOTH OF CORNING, NEW YORK.

SAW FRAME AND TABLE.

Application filed May 20, 1922. Serial No. 562,550.

*To all whom it may concern:*

Be it known that I, CHARLES H. TODD, a citizen of the United States, residing at Dundee, in the county of Yates and State of New York, have invented certain new and useful Improvements in Saw Frames and Tables, of which the following is a specification.

This invention relates to sawing machines, more particularly to cross cut sawing machines, and has for one of its objects to improve the construction and increase the efficiency and utility of devices of this character.

Another object of the invention is to provide a device of this character in which movements of the saw carrying frame are accomplished without rollers or like friction producing elements.

With these and other objects in view the invention consists in certain novel features of construction as herein after shown and described and then specifically pointed out in the claims, and in the drawings illustrative of the preferred embodiment of the invention.

Fig. 3 is a longitudinal section on the line 3—3 of Fig. 1.

Fig. 4 is an end elevation viewed from the "feed" end.

Figure 1:
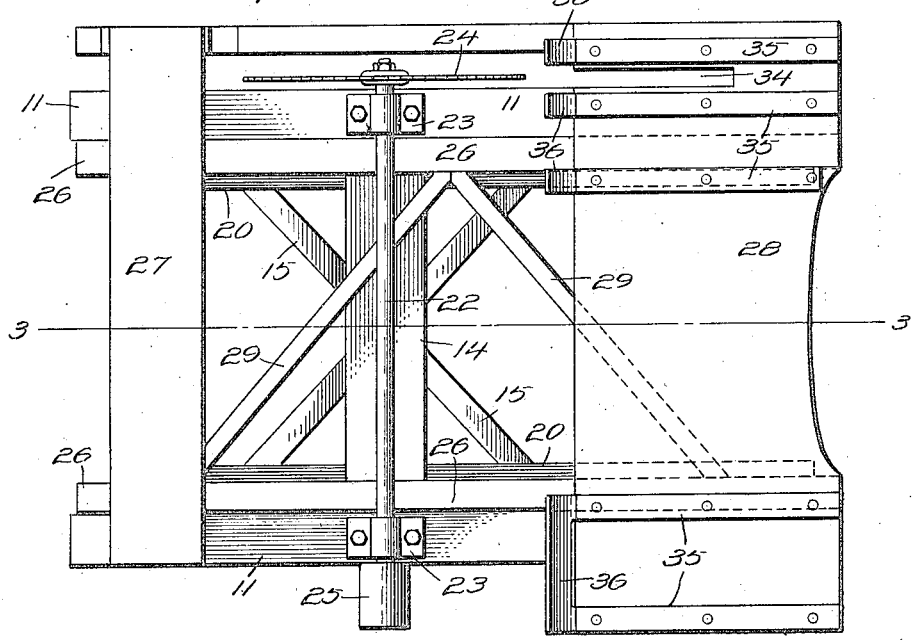
Figure 1 is a plan view.
Figure 2:
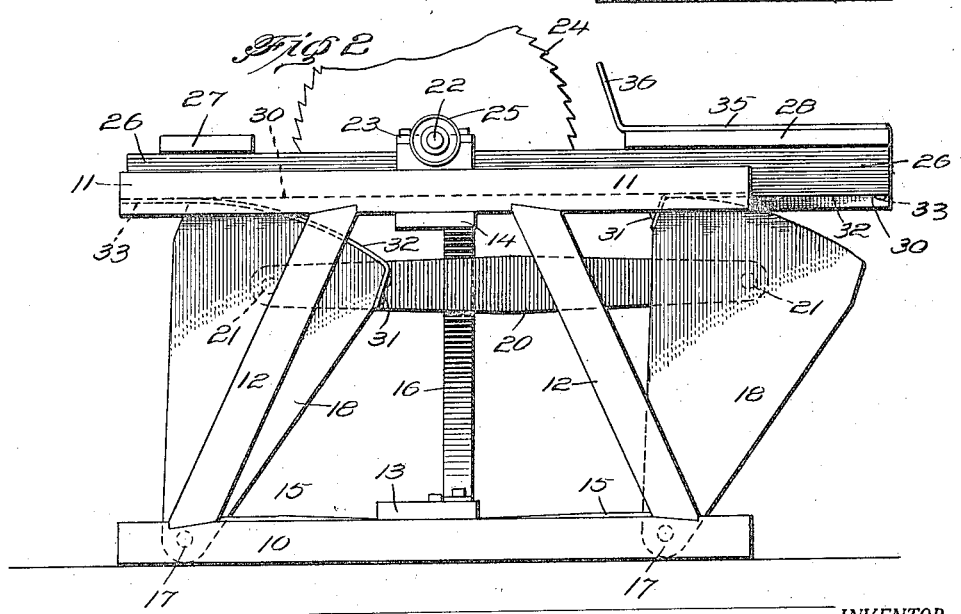
Fig. 2 is a side elevation.

The supporting frame includes spaced sill members 10, upper combined guide and rail members 11, and connecting posts or uprights 12, the latter being preferably reversely inclined as shown.

The sill members 10 are coupled by a lower transverse member 13 and an upper transverse member 14 connects the rail members 11.

The parts thus far described are preferably of wood suitably united, and are further supported and strengthened by diagonal metal strap braces 15 and 16, as shown.

By this means a strong and rigid frame is produced, and may be of any size and of any suitable material.

Pivoted at 17 to the confronting faces of the sill members 10 are swinging supports 18 each having a segmental upper end as shown at 19. Four of the supports are shown, two at each side, and the coacting supports at each side coupled by a bar 20 pivoted at the ends at 21 to the swinging supports, and movable therewith.

A saw carrying shaft or arbor 22 is mounted by bearings 23 upon the frame members 11 and carries a saw 24 of suitable construction, at one end, and a belt pulley 25 at the other end.

Disposed between the rail members 11 is a frame or platform for the material to be severed by the saw, and comprising side members 26 connected at one end by a transverse member 27 and supporting a platform device 28 at the other end.

The members 26 are likewise connected and stiffened by diagonal braces 29.

The side members 26 are formed with longitudinal guideways 30 to receive the upper segmental ends of the supports 18.

Attached at 31 to each of the swinging supports 18 is a flexible element in the form of a strap 32 with the opposite ends of the straps connected at 33 to the ends of the rails 26 and within the longitudinal guideways 30.

By this means as the material supporting frame is caused to move longitudinally of the main supporting frame, the straps 32 will cause the material carrying frame to roll upon the segmental ends 19 of the supports 18, and thus travel in a horizontal line toward and away from the saw and with a minimum of friction.

Formed in the supporting portion 28 is an open slot 34 to receive the saw 24, and attached to the upper face of the member 28 are metal wear strips 35, the latter upturned as shown at 36 to form guards to the material to be severed.

The swinging supports 18 are preferably provided with transverse cleats 37 to receive the pivots 21 of the coupling bars 20, and thus increase the strength of the connection between the bars and the supports.

While four of the swinging supports 18 are shown for illustration, it will be understood that any required number of these members may be employed to increase the length of the table frame as required.

The improved device is simple in construction, can be manufactured of any suitable material and of any required size..

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is:—

1. In an apparatus of the class described, a supporting frame including longitudinally directed rail members in spaced parallel relation, a platform including longitudinally directed members movably engaged by the confronting faces of the rail members and each provided with a downwardly opening guideway adjacent the rail members, a shaft adapted to carry a saw and mounted upon said rail members, operating members mounted to swing from said frame and each having a segmental face constantly engaging in the guideway of the platform side members and against the inner faces of the frame rail members and held from lateral displacement thereby, and flexible elements attached to the platform side members within the guideways thereof and to the swinging operating members, and upon which the platform side members constantly bear.

2. In an apparatus of the class described, a supporting frame including longitudinally directed rail members in spaced parallel relation, a platform including longitudinally directed side members movably engaged by the confronting faces of the rail members and each provided with a downwardly opening guideway adjacent the side rails, a shaft adapted to carry a saw and mounted upon said side rails, operating members mounted to swing from said frame and each having a segmental face constantly engaging in the guideway of the platform side members and against the inner faces of the frame side members and held from lateral displacement thereby, flexible elements attached to the platform side members within the guideways thereof and to the swinging operating members and upon which the platform side members constantly bear, and means for coupling said operating members to move in unison.

3. In an apparatus of the class described, a supporting frame including longitudinally directed rail members in spaced parallel relation, a platform including longitudinally directed side members movably engaged by the confronting faces of the rail members and each provided with a downwardly opening guideway adjacent the side rails, a shaft adapted to carry a saw and mounted upon said rail members, operating members mounted to swing from said frame and each having a segmental face constantly engaging in the guideway of the platform side members and against the inner faces of the frame side members and held from lateral displacement thereby, flexible elements attached to the platform side members within the guideways thereof and to the swinging operating members and upon which the platform side members constantly bear, and a coupling member pivotally connected at its ends respectively to the operating members and causing the same to move in unison.

4. In an apparatus of the class described, a supporting frame including longitudinally directed rail members in spaced parallel relation, a platform including longitudinally directed side members, a shaft adapted to carry a saw mounted upon said rail members, operating members mounted to swing from said frame and each having a segmental face, flexible elements, attached to the platform side members and to the swinging operating member and upon which the platform side members constantly bear, and means for coupling said operating members to move in unison.

In testimony whereof, I affix my signature hereto.

CHARLES H. TODD.